(12) United States Patent
Shirakawa et al.

(10) Patent No.: US 7,208,029 B2
(45) Date of Patent: Apr. 24, 2007

(54) EXHAUST GAS CLEANING SYSTEM

(75) Inventors: Takashi Shirakawa, Yokohama (JP); Yasuhisa Kitahara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 535 days.

(21) Appl. No.: 10/886,661

(22) Filed: Jul. 9, 2004

(65) Prior Publication Data
US 2005/0022520 A1 Feb. 3, 2005

(30) Foreign Application Priority Data
Jul. 31, 2003 (JP) ............................. 2003-284232

(51) Int. Cl.
*B01D 46/00* (2006.01)
*F01N 3/021* (2006.01)
*F01N 3/035* (2006.01)

(52) U.S. Cl. .................... 95/273; 95/278; 55/282.2; 55/282.3; 55/283; 55/385.3; 55/523; 55/DIG. 10; 55/DIG. 30; 60/274; 60/295; 60/297; 60/301; 60/303; 60/311

(58) Field of Classification Search ............ 55/282.2, 55/282.3, 285.3, 283, 523, DIG. 10, DIG. 30; 95/273, 278, 8, 14; 60/274, 285, 286, 295, 60/297, 299, 301, 303, 311
See application file for complete search history.

(56) References Cited

U.S. PATENT DOCUMENTS

| | | | |
|---|---|---|---|
| 6,832,473 B2 * | 12/2004 | Kupe et al. .................... 60/297 |
| 6,874,316 B2 * | 4/2005 | Nakatani .................... 60/286 |
| 6,941,750 B2 * | 9/2005 | Boretto et al. ......... 55/DIG. 30 |
| 7,051,519 B2 * | 5/2006 | Kuboshima et al. .......... 60/297 |
| 7,055,313 B2 * | 6/2006 | Russell ........................ 60/311 |
| 2006/0107649 A1 * | 5/2006 | Kamikawa et al. ........... 60/274 |
| 2006/0107658 A1 * | 5/2006 | Hiranuma et al. ............ 60/297 |

FOREIGN PATENT DOCUMENTS

| JP | 3-233126 A | 10/2001 |
|---|---|---|
| JP | 2002-96232 A | 4/2003 |
| JP | 2003-293742 A | 10/2003 |

\* cited by examiner

*Primary Examiner*—Jason M. Greene
(74) *Attorney, Agent, or Firm*—Global IP Counselors (57) ABSTRACT

An exhaust gas cleaning system is provided that comprises a particulate filter and an NOx trapping catalytic converter disposed upstream of the particulate filter. The exhaust gas cleaning system is configured to determine a combustion amount of the particulate matter accumulated in the particulate filter that are combusted by the NOx in the exhaust gas, and adjust the combustion amount of the particulate matter based on an NOx adsorption condition of the NOx trapping catalytic converter. Then, the exhaust gas cleaning system is configured to estimate a particulate matter accumulation amount in the particulate filter by subtracting the adjusted combustion amount of the particulate matter from a discharge amount of the particulate matter. Thus, the amount of particulate matter accumulated in the particulate filter is estimated more accurately by taking into consideration the combustion of particulate matter by NOx in the exhaust gas.

16 Claims, 5 Drawing Sheets

EXHAUST GAS CLEANING SYSTEM

BACKGROUND OF THE INVENTION

1. Field of the Invention

The present invention relates to an exhaust gas cleaning apparatus for an engine, such as a diesel engine, that uses a particulate filter to collect and remove particulate matter from the exhaust gas discharged from the engine. Additionally, the present invention relates to a method of determining the particulate matter accumulation state of the particulate filter.

2. Background Information

Harmful exhaust components such as carbon particles and other particulate matters (particulate matter or "PM") contained in an exhaust gas have become an enormous problem especially in diesel engines. Conventionally, various types of particulate matter capturing filters (Diesel Particulate Filter or "DPF") have been used as exhaust gas aftertreatment devices to collect and remove the particulate matter contained in the exhaust gas.

When this type of particulate filter is used, the particulate filter needs to be regenerated when an amount of accumulated particulate matter reaches a prescribed amount by combusting the particulate matter accumulated in the particulate filter. Therefore, it is necessary to determine or estimate an amount or degree of the particulate matter accumulated in the particulate filter.

Japanese Laid-Open Patent Publication No. 3-233126 describes an exhaust gas cleaning apparatus in which an air fuel ratio of an exhaust gas discharged from an engine is detected and an amount of particulate matter accumulated in a particulate filter within a prescribed time unit is calculated based on the air fuel ratio of the exhaust gas. Then, the amount of particulate matter accumulated within the prescribed time unit is consecutively integrated (added up) over time to determine to regenerate the particulate filter when a value of the integration calculation reaches a prescribed value. Moreover, the exhaust gas cleaning apparatus described in the above mentioned reference is configured such that a mandatory regeneration is executed for a prescribed amount of time and then the regeneration stops. When the regeneration stops, the amount of accumulated particulate matter calculated is reset to 0.

In view of the above, it will be apparent to those skilled in the art from this disclosure that there exists a need for an improved exhaust gas cleaning system. This invention addresses this need in the art as well as other needs, which will become apparent to those skilled in the art from this disclosure.

SUMMARY OF THE INVENTION

It has been discovered that in the conventional exhaust gas cleaning apparatus disclosed in the above mentioned reference, a relatively high temperature is required for the particulate matter accumulated in the particulate filter to be combusted with oxygen. Conversely, the particulate matter can be combusted at a relatively low temperature by oxidizing the particulate matter with NOx contained in exhaust gas. In other words, the NOx contained in the exhaust gas discharged from the engine acts to oxidize (combust) the particulate matter accumulated in the particulate filter, and thus, to reduce the amount of the particulate matter accumulated in the particulate filter over a comparatively wide range of operating conditions.

The conventional exhaust gas cleaning apparatus disclosed in the above mentioned reference does not take the combustion of the particulate matter due to NOx into consideration. Consequently, the conventional exhaust gas cleaning apparatus in the above mentioned reference achieves a less accurate estimation of the amount of the particulate matter accumulated in the particulate filter.

Particularly in engines (such as diesel engines) that operate with a relatively lean air fuel ratio, NOx is also one of the harmful exhaust components contained in the exhaust gas discharged from the engine. Thus, in recent years, an exhaust gas cleaning apparatus includes an NOx trapping catalytic converter provided upstream of the particulate filter. When the NOx trapping catalytic converter is installed upstream of the particulate filter, the amount of NOx flowing into the particulate filter is small when the adsorbing capacity of the NOx trapping catalytic converter is high (i.e., the NOx trapping catalytic converter is actively adsorbing NOx). On the other hand, the amount of NOx flowing into the particulate filter is very large when the adsorbing capacity of the NOx trapping catalytic converter is low (i.e., when the NOx trapping catalytic converter is saturated with NOx). Consequently, the combustion of the particulate matter by NOx does not always proceed consistently. Thus, estimating the amount of the particulate matter accumulated in the particulate filter accurately becomes difficult.

Accordingly, one of the objects of the present invention is to provide an exhaust gas cleaning system that can accurately estimate the amount of the particulate matter accumulated in the particulate filter even when an NOx trapping catalytic converter is arranged upstream of the particulate filter.

In order to achieve the above mentioned and other objects of the present invention, an exhaust gas cleaning system is provided that comprises a particulate filter, an NOx trapping catalytic converter, a particulate matter discharge amount determining section, a particulate matter combustion amount determining section, a combustion amount adjusting section, and a particulate matter accumulation amount. The particulate filter is installed in an exhaust passage of an engine to capture particulate matter contained in an exhaust gas discharged from the engine. The NOx trapping catalytic converter is disposed upstream of the particulate filter in the exhaust passage to absorb NOx contained in the exhaust gas. The particulate matter discharge amount determining section is configured and arranged to determine a discharge amount of the particulate matter from the engine based on an operating condition of the engine. The particulate matter combustion amount determining section is configured and arranged to determine a combustion amount of the particulate matter accumulated in the particulate filter that are combusted by the NOx in the exhaust gas. The combustion amount adjusting section is configured and arranged to adjust the combustion amount of the particulate matter estimated in the particulate matter combustion amount determining section based on an NOx adsorption condition of the NOx trapping catalytic converter. The particulate matter accumulation amount estimating section is configured and arranged to estimate a particulate matter accumulation amount in the particulate filter by subtracting the combustion amount of the particulate matter adjusted in the combustion amount adjusting section from the discharge amount of the particulate matter.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
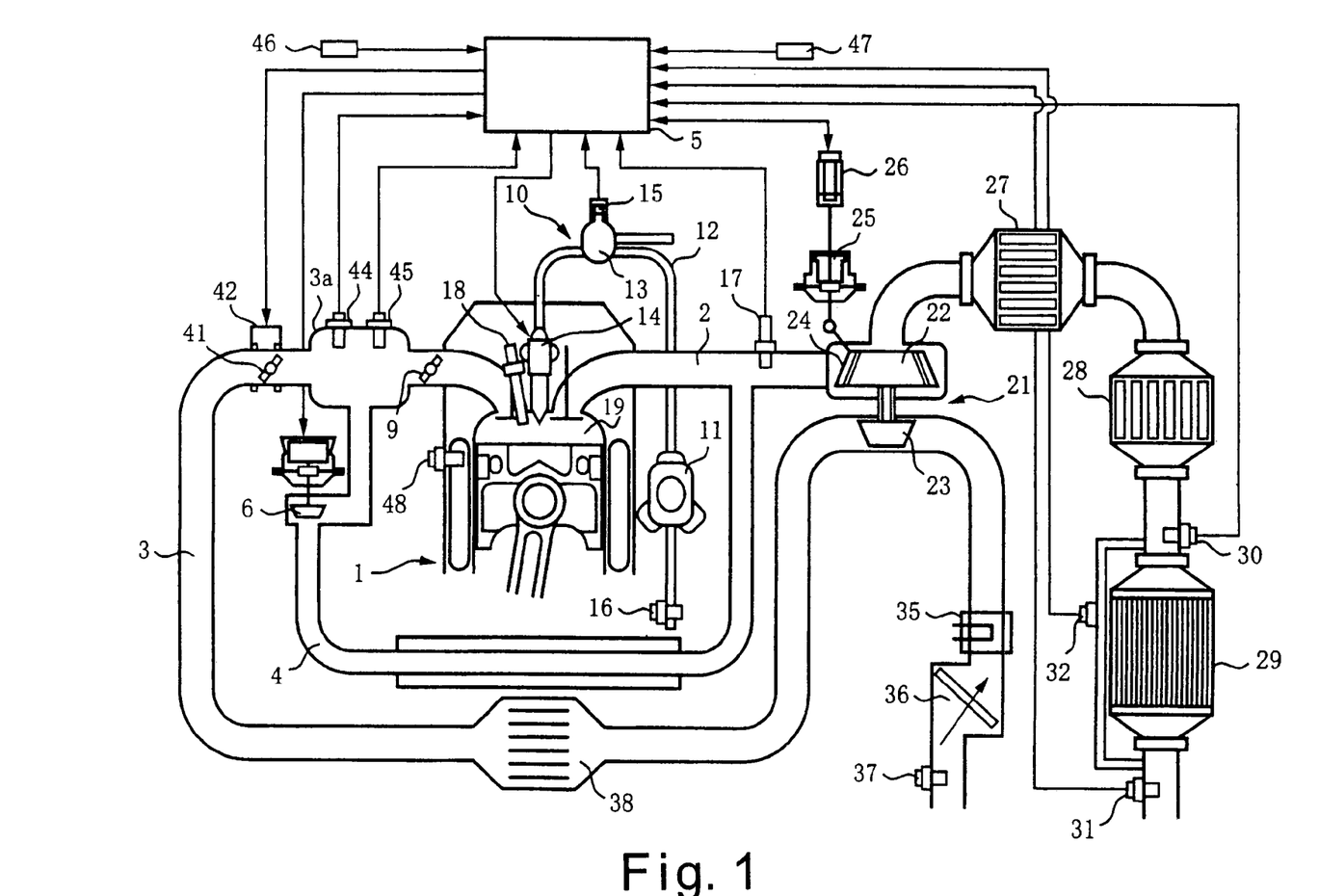
FIG. 1 is a diagrammatic view of an exhaust gas cleaning system for an internal combustion engine, e.g., a diesel engine, in accordance with one embodiment of the present invention.

Referring initially to FIG. 1, an exhaust gas cleaning system is illustrated for an internal combustion engine such as a turbocharged diesel engine 1 in accordance with a first embodiment of the present invention. The exhaust gas cleaning system in accordance with the present invention can be applied to other internal combustion engines used in automobiles and the like. The engine 1 preferably performs a comparatively large quantity of exhaust gas recirculation (EGR). With the present invention, the amount of particulate matter combusted by NOx can be accurately estimated even when an NOx trapping catalytic converter is arranged upstream of the particulate filter. As a result, an actual amount of particulate matter accumulated in the particulate filter can be estimated with good precision and the particulate filter can be regenerated at an appropriate time.

As seen in FIG. 1, the engine 1 has an exhaust passage 2 and an intake passage 3 with a collector 3a. An EGR passage 4 links the exhaust passage 2 to the collector 3a of the air intake passage 3. The operation of the engine 1 is controlled by an engine control unit 5. More specifically, the control unit 5 preferably includes a microcomputer with a control program that controls the engine 1 as discussed below. The control unit 5 can also include other conventional components such as an input interface circuit, an output interface circuit, and storage devices such as a ROM (Read Only Memory) device and a RAM (Random Access Memory) device. The microcomputer of the control unit 5 is programmed to control the various components of the engine 1. The memory circuit stores processing results and control programs that are run by the processor circuit. The control unit 5 is operatively coupled to the various components of the engine 1 in a conventional manner. The internal RAM of the control unit 5 stores statuses of operational flags and various control data. The control unit 5 is capable of selectively controlling any of the components of the control system in accordance with the control program. It will be apparent to those skilled in the art from this disclosure that the precise structure and algorithms for the control unit 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

An EGR valve 6 is disposed in the EGR passage 4 and is operatively connected to the engine control unit 5. Preferably, the valve opening degree of the EGR valve 6 can be continuously and variably controlled by a stepping motor or any other device that can continuously and variably control the valve opening degree of the EGR valve 6. The valve opening degree of the EGR valve 6 is controlled by the engine control unit 5 to obtain a specified EGR rate in response to the operating conditions received by the engine control unit 5 from various operating condition sensors. In other words, the valve opening degree of the EGR valve 6 is variably controlled so as to variably control the EGR rate towards a target EGR rate set by the engine control unit 5. For example, the EGR rate is set to a large EGR rate when the engine 1 is operating in a low-speed, low-load region, and as the engine speed and load becomes higher, the EGR rate becomes lower.

A swirl control valve 9 is provided in the intake passage 3 in the vicinity of an air intake port of the engine 1. The swirl control valve 9 is configured and arranged to produce a swirling flow inside the combustion chamber 19 depending on the operating conditions of the engine 1. The swirl control valve 9 is driven by an actuator (not shown) and opened and closed in response to a control signal from the control unit 5. For example, the swirl control valve 9 is preferably closed in a low load and low speed condition to produce a swirling flow inside the combustion chamber 19.

The engine 1 is also preferably equipped with a common rail fuel injection device 10. In this common rail fuel injection device 10, after fuel is pressurized by a high pressure fuel pump 11, the fuel is fed through a high-pressure fuel supply passageway 12 such that the fuel accumulates in an accumulator 13 (common rail). The fuel is then distributed from this accumulator 13 to a plurality of fuel injection nozzles 14 for each of the engine cylinders. The control unit 5 is configured to control the opening and closing of the nozzles of each of the fuel injection nozzles 14 to inject fuel into the engine cylinders. The fuel pressure inside the accumulator 13 is variably adjusted by a pressure regulator (not shown) and a fuel pressure sensor 15 is provided in the accumulator 13 for detecting the fuel pressure. The fuel pressure sensor 15 is configured and arranged to output to the control unit 5 a fuel pressure signal that is indicative of the fuel pressure in the accumulator 13.

A fuel temperature sensor 16 is arranged upstream of the fuel pump 11. The fuel temperature sensor 16 is configured and arranged to detect the fuel temperature and output to the control unit 5 a signal that is indicative of the fuel temperature. In addition, a conventional glow plug 18 is arranged in the combustion chamber 19 of each of the engine cylinders to ignite the fuel in each combustion chamber 19.

The engine 1 has a variable-capacity turbo supercharger 21 equipped with a coaxially arranged exhaust turbine 22 and a compressor 23. The exhaust turbine 22 is positioned in the exhaust passage 2 at a position downstream of a portion where the EGR passage 4 connects to the exhaust passage 2. In order to vary a capacity of the turbo supercharger 21, the turbo supercharger 21 is provided with a variable nozzle 24 or a capacity adjusting device arranged at a scroll inlet of the exhaust turbine 22. In other words, a capacity of the turbo supercharger 21 can be varied depending on the engine operating conditions. For example, a relatively small capacity of the turbo supercharger 21 is preferably achieved by reducing an opening degree of the variable nozzle 24 when the exhaust gas flow rate is relatively small (such as a low speed region). On the other hand, a relatively large capacity is preferably achieved by increasing the opening degree of the variable nozzle 24 when the exhaust gas flow rate is relatively large (such as a high speed region). The variable nozzle 24 is preferably driven by a diaphragm actuator 25 configured to respond to a control pressure (negative control pressure), and the control pressure is generated using a duty-controlled pressure control valve 26. A wide-range air fuel ratio sensor 17 is provided on the upstream side of the exhaust turbine 22. The air-fuel ratio sensor 17 is configured and arranged to detect the air fuel ratio of the exhaust gas. Thus, the air-fuel ratio sensor 17 is further configured and arranged to output to the control unit 5 a signal that is indicative of the exhaust air-fuel ratio.

The exhaust system of the engine 1 includes an oxidation catalytic converter 27 disposed in the exhaust passage 2 on the downstream side of the exhaust turbine 22. The oxidation catalytic converter 27 has an oxidation catalyst that oxidizes, for example, CO and HC contained in the exhaust gas. The exhaust system of the engine 1 also includes an NOx trapping catalytic converter 28 that is configured to treat NOx in the exhaust passage 2 on the downstream side of the oxidation catalytic converter 27. Thus, the oxidation catalytic converter 27 and the NOx trapping catalytic converter 28 are arranged in sequence in the exhaust passage 2 downstream of the exhaust gas turbine 22. This NOx trapping catalytic converter 28 is configured and arranged to adsorb NOx when the exhaust air-fuel ratio of the exhaust flowing into the NOx trapping catalytic converter 28 is lean. Thus, the oxygen density of the exhaust flowing into the NOx trapping catalytic converter 28 drops. When an oxygen concentration of the exhaust gas decreases, the NOx trapping catalytic converter 28 releases the adsorbed NOx and cleans the exhaust gas by catalytic action so as to perform a purification process.

The exhaust system of the engine 1 also includes an exhaust gas after-treatment system such as a particulate filter 29 (diesel particulate filter: DPF) that is equipped with a catalyst for collecting and removing exhaust particulate matter (particulate matter or "PM"). The particulate filter 29 is provided on the downstream side of the NOx trapping catalytic converter 28. The particulate filter 29 is constructed, for example, with a wall flow honeycomb structure (alternate cannel end blocked type) having a solid-cylindrical filter material such as cordierite with a plurality of honeycomb-shaped, fine passages formed therein and the alternate ends of the passages are closed.

The exhaust system of the engine 1 also includes a filter inlet temperature sensor 30 and a filter outlet temperature sensor 31 that are provided on the inlet side and outlet side of the particulate collection filter 29, respectively. The temperature sensors 30 and 31 are configured and arranged to detect the exhaust temperature at the inlet side and outlet side, respectively. Thus, the temperature sensors 30 and 31 are further configured and arranged to output to the control unit 5 a signal that is indicative of the exhaust temperature at the inlet side and outlet side, respectively.

Since a pressure loss of the particulate filter 29 changes as the exhaust particulate matter accumulates, a pressure difference sensor 32 is provided to detect the pressure difference between the inlet and outlet of the particulate collection filter 29. Of course, it will be apparent to those skilled in the art from this disclosure that, instead of using the pressure difference sensor 32 to detect the pressure difference directly, separate pressure sensors can be provided at the inlet and the outlet of the particulate filter 29 to find the pressure difference based on the two pressure values. A muffler (not shown) is also preferably disposed downstream of the particulate collection filter 29.

The intake air system of the engine 1 preferably includes an airflow meter 35 that is configured and arranged to detect a fresh intake air quantity passing through the air intake passage 3. The airflow meter 35 is provided on the upstream side of the compressor 23 in the air intake passage 3. The airflow meter 35 is configured and arranged to output to the control unit 5 a signal that is indicative of the fresh intake air quantity passing through the air intake passage 3.

The intake air system of the engine 1 preferably includes an air filter 36 and an atmospheric pressure sensor 37 that are positioned on the upstream side of the airflow meter 35. The atmospheric pressure sensor 37 configured and arranged to detect outside pressure, i.e., atmospheric pressure. The atmospheric pressure sensor 37 is provided at the inlet of the air filter 36. The atmospheric pressure sensor 37 is configured and arranged to output to the control unit 5 a signal that is indicative of the outside air pressure entering the air intake passage 3.

The intake air system of the engine 1 preferably includes an intercooler 38 to cool the high-temperature supercharged air. The intercooler 38 is disposed in the air intake passage 3 between the compressor 23 and a collector 3a.

In addition, the intake air system of the engine 1 preferably includes an intake air throttle valve 41 that is configured to restrict the fresh intake air quantity. The intake air throttle valve 41 is installed in the air intake passage 3 on the inlet side of the collector 3a of the air intake passage 3. The opening and closing of this intake air throttle valve 41 is driven by control signals of the engine control unit 5 through an actuator 42 that preferably includes a stepper motor or the like. Further, a supercharging pressure sensor 44 that detects supercharging pressure and an intake temperature sensor 45 that detects intake air temperature are provided in the collector 3a.

The control unit 5 is configured and arranged to control a fuel injection quantity and a fuel injection timing of the fuel injection device 10, the opening degree of the EGR valve 6, the opening degree of the variable nozzle 24, and other components and functions of the engine 1. Moreover, in addition to the various sensors installed in the engine 1 as mentioned above, the control unit 5 is configured and arranged to receive detection signals from an accelerator position sensor 46 for detecting a depression amount of the accelerator pedal, an engine rotational speed sensor 47 for detecting the rotational speed of the engine, and a temperature sensor 48 for detecting the temperature of the engine coolant.

Figure 2:
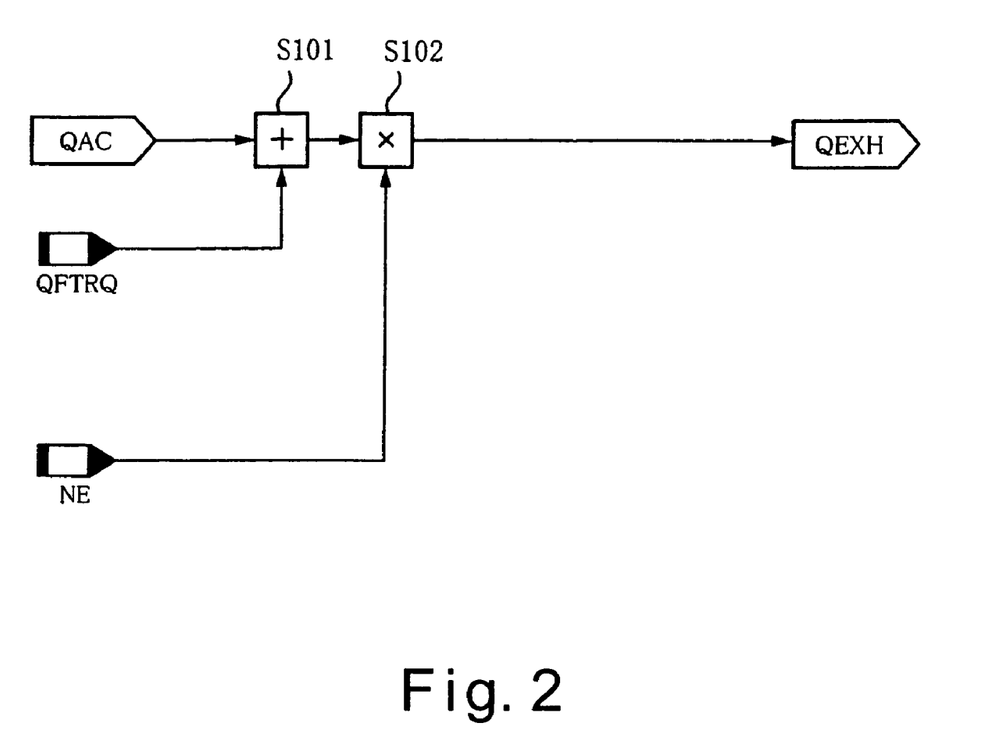
FIG. 2 is a functional block diagram illustrating control operations executed by a control unit of the exhaust gas cleaning system in accordance with the present invention in order to determine an exhaust gas flow rate.
Figure 3:
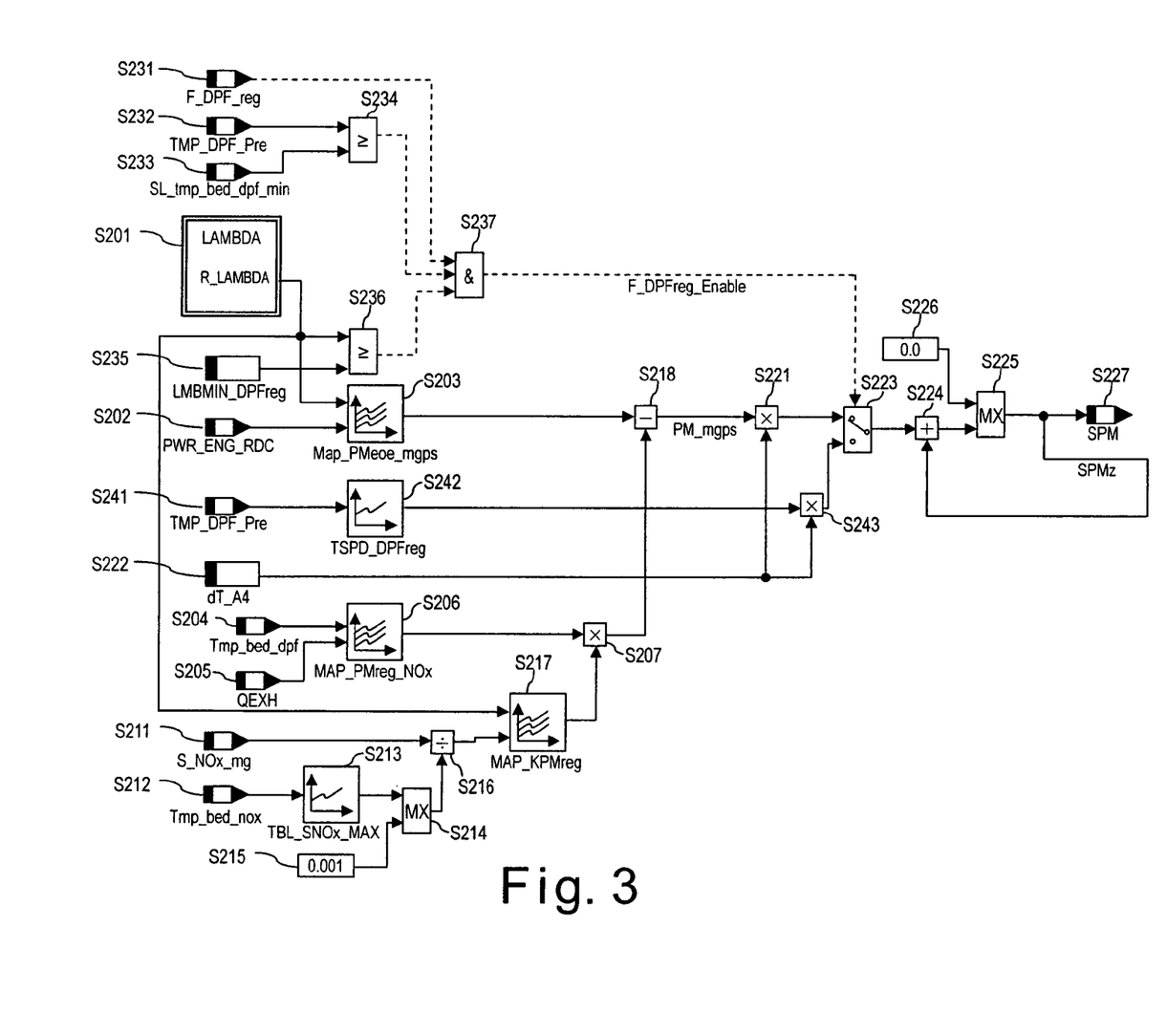
FIG. 3 is a functional block diagram illustrating control operations executed by the control unit of the exhaust gas cleaning system in accordance with the present invention in order to determine a particulate matter accumulation amount.

Referring now to FIGS. 2 and 3, the control operations executed by the control unit 5 in order to determine an amount of particulate matter accumulated in the particulate filter 29 will now be described. Many of the functions described are functions that can be executed using software processing.

FIG. 2 is a functional diagram showing a flow of the control processing for determining an exhaust gas flow rate QEXH. First, in step S101, a fresh air quantity QAC that flows into the cylinder and a fuel quantity QFTRQ that is injected into the cylinder are added together. Then, in step S102, the resulting sum in step S101 is multiplied by an engine rotational speed NE to obtain the exhaust gas flow rate QEXH.

FIG. 3 is a functional diagram for illustrating the processing to calculate a particulate matter accumulation amount SPM. Basically, in the calculation of the particulate matter accumulation amount SPM, first the amount of the particulate matter discharged from the engine 1 per unit time is calculated. Also, the amount of the particulate matter that is oxidized (combusted) by NOx and the amount of particulate matter that is combusted by oxygen during regeneration of the particulate filter 29 are calculated. The amount of the particulate matter that is oxidized (combusted) by NOx and the amount of particulate matter that is combusted by oxygen during regeneration are subtracted from the amount of particulate matter discharged from the engine 1 per unit time to find an amount by which the particulate matter accumulated in the particulate filter 29 increases or decreases per unit time (increase/decrease amount). Then, the particulate matter accumulation amount SPM is estimated by integrating the amount by which the amount of the particulate matter accumulated in the particulate filter 29 increases or decreases per unit time.

As seen in FIG. 3, the amount of particulate matter discharged per unit time (particulate matter discharge rate) from the engine 1 is found using a prescribed map Map_P-Meoe_mgps in step S203 based on an engine output PWR_ENG_RDC (shown in S202) of the engine 1 at the control cycle and an exhaust gas air fuel ratio (more precisely, excess air ratio λ) LAMBDA (shown in S201) detected by the air fuel ratio sensor 17. The particulate matter discharge rate is preferably expressed in units of weight per unit time, e.g., mg/s. The engine output PWR_ENG_RDC is preferably calculated based on the torque (load) of the engine 1 (as indicated by the fuel injection quantity or the like) and the engine rotational speed NE.

Figure 4:
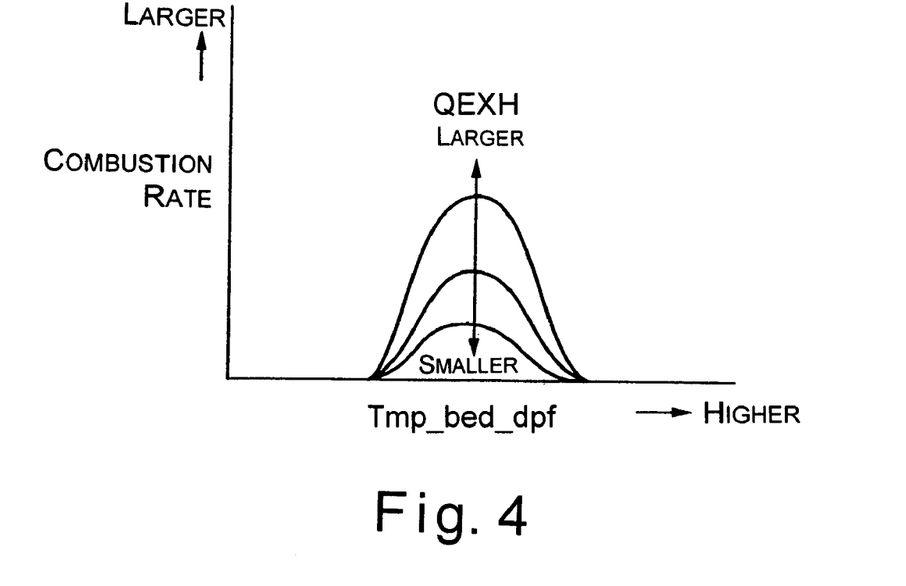
FIG. 4 is a characteristic chart illustrating a map MAP_P-Mreg_NOx used in a step S206 in the block diagram of FIG. 3 in accordance with the present invention.

Also, in step S206, the control unit 5 is configured and arranged to determine a reference particulate matter combustion rate. The reference particulate matter combustion rate is defined as an amount of the particulate matter combusted per unit time by the NOx that flows into the particulate filter 29. More specifically, the reference particulate matter combustion rate is determined using a prescribed map MAP_PMreg_NOx based on a temperature Tmp_bed-_dpf (shown in S204) of the particulate filter 29 and the exhaust gas flow rate QEXH (shown in S205) obtained in steps S101 to S102 in FIG. 2. FIG. 4 shows the general characteristic of the prescribed map MAP_PMreg_NOx. As shown in FIG. 4, the combustion rate of the particulate matter due to NOx is high within a certain range of temperatures and becomes lower when the temperature is on the lower side or higher side of the certain range. Moreover, as seen in FIG. 4, the combustion rate also increases as the exhaust gas flow rate QEXH increases. The combustion rate of the particulate matter is also preferably expressed in such unit as mg/s. The temperature Tmp_bed_dpf of the particulate filter 29 preferably determined by averaging the exhaust gas temperature at the inlet of the particulate filter 29 and the exhaust gas temperature at the outlet of the particulate filter 29. The temperatures at the inlet and the outlet of the particulate filter 29 are detected by the filter inlet temperature sensor 30 and the filter outlet temperature sensor 31, respectively. Of course, it will be apparent to those skilled in the art from this disclosure to provide a separate temperature sensor for measuring the temperature of the particulate filter 29 directly.

As described above, the amount of NOx flowing into the particulate filter 29 changes depending on the condition of the NOx trapping catalytic converter 28, which is arranged upstream of the particulate filter 29. Thus, the rate at which particulate matter accumulated in the particulate filter 29 is combusted by NOx also changes. Consequently, in steps S211 to S217 of FIG. 3, the control unit 5 is configured and arranged to determine a correction coefficient KPM corresponding to the flow rate of NOx entering the particulate filter 29. Then, in step S207, the control unit 5 is configured and arranged to multiply the reference particulate matter combustion rate obtained in step S206 by the correction coefficient KPM to find the actual combustion rate (particulate matter combustion amount) at which the particulate matter accumulated in the particulate filter 29 is combusted by the NOx.

More specifically, in step S211, the control unit 5 is configured and arranged to obtain an NOx adsorption amount S_NOx_mg adsorbed by the NOx trapping catalytic converter 28. The NOx adsorption amount S_NOx_mg is obtained by using, for example, a method presented in Japanese Patent Publication No. 2002-96232. According to the method disclosed in this reference, a running total of the amount of NOx absorbed in the NOx trapping catalytic converter 28 is calculated in a consecutive manner by repeatedly adding or subtracting an amount of NOx adsorbed and an amount of NOx discharged per unit time or per cycle.

In step S212, the control unit 5 is configured and arranged to determine a temperature Tmp_bed_nox of the NOx trapping catalytic converter 28 by, for example, estimating based on the temperature detected by the filter inlet temperature sensor 30. Also, the temperature detected by the filter inlet temperature sensor 30 can be used as the temperature Tmp_bed_nox of the NOx trapping catalytic converter 28 in order to simplify the processing. Of course, it will be apparent to those skilled in the art from this disclosure that a separate sensor can be provided to measure the temperature of the catalyst support of the NOx trapping catalytic converter 28 directly.

Figure 5:
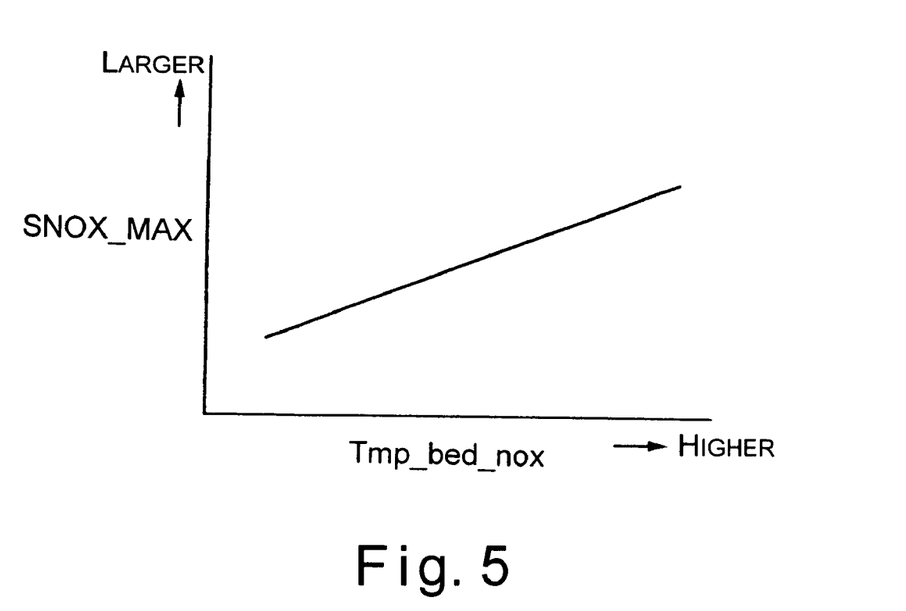
FIG. 5 is a characteristic chart illustrating a map TBL_SNOX_MAX used in a step S213 in the block diagram of FIG. 3 in accordance with the present invention.

In step S213, the control unit 5 is configured and arranged to determine a maximum NOx amount SNOX_MAX that can be adsorbed by the NOx trapping catalytic converter 28 at the particular control cycle based on the temperature Tmp_bed_nox of the NOx trapping catalytic converter 28 by referring to a prescribed map TBL_SNOX_MAX. FIG. 5 illustrates the general characteristic of the prescribed map TBL_SNOX_MAX. As seen in FIG. 5, the maximum NOx amount SNOX_MAX that can be adsorbed by the NOx trapping catalytic converter 28 changes depending on the temperature Tmp_bed_nox of the NOx trapping catalytic converter 28 (i.e., the maximum NOx amount SNOX_MAX decreases as the temperature Tmp_bed_nox decreases).

Then, in step 216, the control unit 5 is configured and arranged to divide the NOx adsorption amount S_NOx_mg that is actually absorbed in the NOx trapping catalytic converter obtained from step S211 by the maximum NOx amount SNOX_MAX. Thus, the output of step S216 is the ratio of NOx adsorbed by the NOx trapping catalytic converter 28 (an NOx adsorption ratio R_NOX) at that point in time. Steps S214 and S215 function to ensure that the value of the maximum NOx amount SNOX_MAX (which is the maximum amount of NOx that can be adsorbed according to the temperature Tmp_bed_nox) does not fall below a prescribed minimum value (e.g., 0.001).

When the NOx adsorption ratio R_NOX is close to 1, the NOx trapping catalytic converter 28 is close to being saturated, i.e., an adsorbing capacity of the NOx trapping catalytic converter 28 is close to zero. In such a case, the NOx discharged from the engine 1 proceeds to the particulate filter 29 without being adsorbed in the NOx trapping catalytic converter 28. On the other hand, when the NOx adsorption ratio R_NOX is close to 0, the NOx trapping catalytic converter 28 has ample adsorbing capacity and most of the NOx discharged from the engine 1 is adsorbed by the NOx trapping catalytic converter 28. Thus, in such a case, most of the NOx discharged from the engine 1 does not reach the particulate filter 29.

Figure 6:
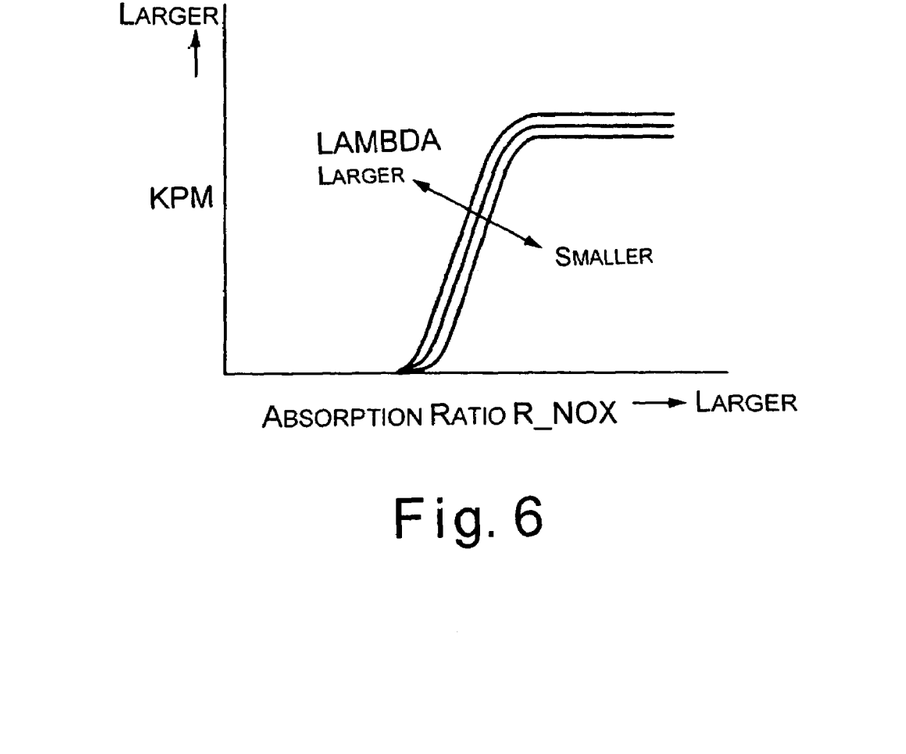
FIG. 6 is a characteristic chart illustrating a map MAP_KPMreg used in a step S217 in the block diagram of FIG. 3 in accordance with the present invention.

In step S217, the control unit 5 is configured and arranged to find the correction coefficient KPM using a prescribed map MAP_KPMreg based on the NOx adsorption ratio R_NOX and the exhaust gas air fuel ratio LAMBDA of the engine 1. FIG. 6 illustrates the general characteristic of the prescribed map MAP_KPMreg. As shown in FIG. 6, the correction coefficient KPM is substantially 0 in a region where the NOx adsorption ratio R_NOX is relatively small. Thus, when the NOx absorption ratio R_NOX is relatively small, the actual rate of particulate matter combustion due to NOx obtained in S207 by multiplying by the correction coefficient KPM is 0 or a very small value. On the other hand, as seen in FIG. 6, the correction coefficient KPM has a value close to the maximum value (e.g., 1) in a region where the NOx adsorption ratio is relatively large. Also when the exhaust gas air fuel ratio (excess air ratio) LAMBDA is smaller, the rate of particulate matter combustion due to NOx is smaller, and thus, the correction coefficient KPM has a relatively small value. On the other hand, when the exhaust gas air fuel ratio (excess air ratio) LAMBDA is larger, the rate of particulate matter combustion due to NOx is larger, and thus, the correction coefficient KPM has a relatively large value.

In step S218, the control unit 5 is configured and arranged to subtract the rate at which particulate matter is combusted by NOx calculated in step S207 from the rate at which particulate matter is discharged from the engine 1 (i.e., amount of particulate matter discharged per unit time). Thus, the output of step S218 is equivalent to the amount by which the amount of particulate matter accumulated in the particulate filter increases or decreases per unit time (increase/decrease amount) with the combustion by NOx taken into consideration. Depending on the operating condition of the engine 1, there are times when the rate at which particulate matter is combusted by NOx obtained in step S207 exceeds the rate at which particulate matter is discharged from the engine 1 obtained in step S202. At such times, the output of S218 is outputted as a negative value.

In step S221, the control unit 5 is configured and arranged to multiply the amount of increase or decrease per unit time calculated in step S218 by a constant dT_A4 (shown in step S222) corresponding to a sampling time. The output of step S221 passes through the switching unit of step S223 and is added to the previous value of the particulate matter accumulation amount SPM (shown in step S227) in step S224.

Thus, the output of step S227 becomes an updated particulate matter accumulation amount SPM. The control unit 5 is configured and arranged to imposes a limit in steps S225 and S226 to ensure that the particulate matter accumulation amount SPM does not fall below a minimum value of 0 (S226). Thus, the particulate matter accumulation amount SPM does not become a negative value when the particulate matter accumulation amount SPM continuously decreases due to combustion of the particulate matter.

The particulate matter accumulation amount SPM determined in step S227 as described above is then compared with a threshold value. If the particulate matter accumulation amount SPM has reached the threshold value, the control unit 5 is configured and arranged to execute a mandatory regeneration of the particulate filter 29. The regeneration of the particulate filter 29 can be accomplished using any of various conventional methods. For example, the exhaust particulate matter accumulated in the particulate filter 29 can be combusted by closing the intake air throttle valve 41 so that the exhaust gas temperature is raised, or by executing a post fuel injection (an additional fuel injection executed after the main injection) so that the exhaust gas temperature is raised.

Steps S231 to S237 are the processing executed by the control unit 5 in order to estimate the particulate matter accumulation amount SPM during the mandatory regeneration of the particulate filter 29, i.e., during the deliberate combustion of the particulate matter accumulated in the particulate filter 29 by using exhaust heat or oxygen.

In step S231, the control unit 5 is configured and arranged to set a particulate filter regeneration request flag F_DPF_reg as one of the inputs to an AND operation of step S237. The particulate filter regeneration request flag F_DPF_reg indicates whether or not a control for regenerating the particulate filter 29 is currently in progress.

In step S234, the control unit 5 is configured and arranged to determine whether the inlet temperature TMP_DPF_Pre (shown in S232) detected by the filter inlet temperature sensor 30 is equal to or higher than a minimum temperature SL_tmp_bed_dpf_min (shown in S233) required for regeneration. The output of step S234 is also set as one of the inputs to the AND operation of step S237. The minimum temperature SL_tmp_bed_dpf_min can be arranged as a fixed value or a value that is set according to the operating condition of the engine 1.

In step S236, the control unit 5 is configured and arranged to determine whether the exhaust gas air fuel ratio (excess air ratio) LAMBDA at that point in time is equal to or higher than a minimum air fuel ratio LMBMIN_DPFreg (shown in S235) (e.g., 1.05) required for regeneration of the particulate filter 29. The output of step S236 is also set as one of the inputs to the AND operation of step S237.

When the three input conditions from steps S231, S234 and S236 are all satisfied simultaneously, the AND operation of step S237 outputs a flag F_DPFreg_Enable that indicates that regeneration of the particulate filter 29 is in progress (i.e., the particulate matter accumulated in the particulate filter 29 is being combusted). The position of the switching unit of step S223 is set based on the value of the flag F_DPFreg_Enable. In other words, when the three conditions as explained above are satisfied, sufficient oxygen and a sufficiently high exhaust gas temperature exist in the exhaust gas cleaning system to cause the particulate matter accumulated in the particulate filter 29 to be combusted. Thus, the amount of the particulate matter accumulated in the particulate filter 29 gradually decreases, i.e., the particulate filter 29 is regenerated.

Figure 7:
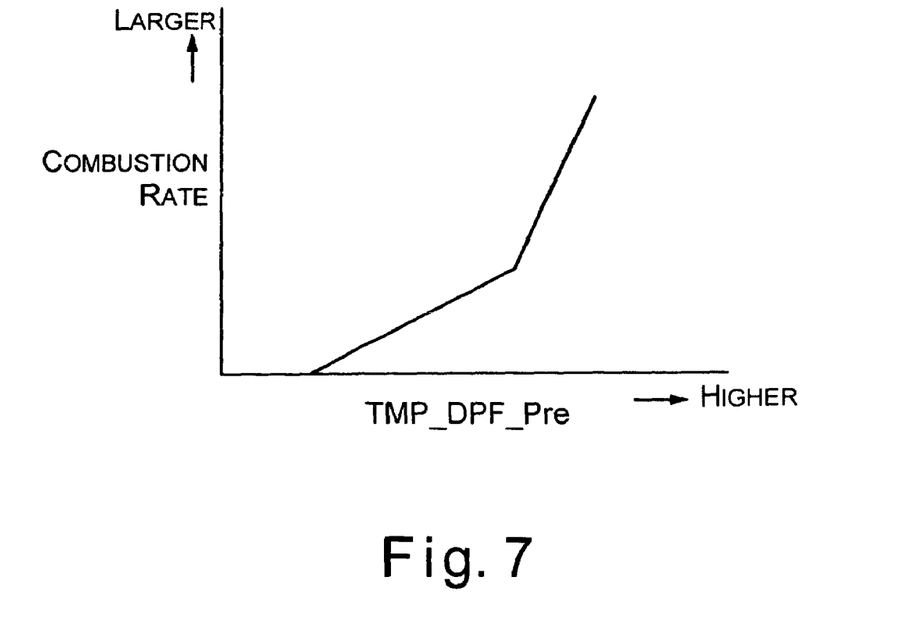
FIG. 7 is a characteristic chart illustrating a map TSPD_DPFreg used in a step S242 in the block diagram of FIG. 3 in accordance with the present invention.

In step S242, the control unit 5 is configured and arranged to determine the combustion rate (filter regeneration combustion amount) at which the particulate matter is being combusted by oxygen during the regeneration of the particulate filter 29 based on the inlet temperature TMP_DPF_Pre (shown in step S241) detected by the filter inlet temperature sensor 30 by referring to a prescribed map TSPD_DPFreg. FIG. 7 illustrates the general characteristic of the prescribed map TSPD_DPFreg. The combustion rate, too, is preferably expressed in unit of mg/s. Since the combustion rate indicates a rate at which the amount of particulate matter accumulated in the particulate filter 29 decreases, the combustion rate is outputted as a negative value in step S242 as the characteristic shown in FIG. 7 is inverted.

In step S243, the control unit 5 is configured and arranged to multiply the output of step S242 (which is equivalent to the amount by which the particulate matter decreases per unit time) by a constant dT_A4 (shown in step S222) corresponding to the sampling time. The output of step S243 passes through the switching unit of step S223 and is added to the previous value of the particulate matter accumulation amount SPM (S222) in step S224. Thus, the output of step S227 becomes an updated particulate matter accumulation amount SPM. The particulate matter accumulation amount SPM decreases gradually due to the regeneration of the particulate filter 29. As described earlier, steps S225 and S226 impose a limit to ensure that the particulate matter accumulation amount SPM does not become a negative value. As a result, the estimation of the particulate matter accumulation amount SPM does not incur error after the regeneration of the particulate filter 29 is executed.

Accordingly, the embodiment explained above is configured and arranged to estimate the particulate matter accumulation amount SPM of particulate matter accumulated in the particulate filter 29 while taking into consideration the fact that particulate matter is combusted by NOx at a relatively low temperature. In particular, in the present invention, the effect of the adsorption of NOx in the NOx trapping catalytic converter 28 positioned upstream of the particulate filter 29 is taken into consideration in estimating the particulate matter accumulation amount SPM. As a result, the exhaust gas cleaning system of the present embodiment can estimate an actual amount of particulate matter accumulated in the particulate filter 29 more accurately. Thus, incorrect determinations of the regeneration timing caused by combustion of the particulate matter by NOx can be avoided. In other words, the present invention can execute the regeneration of the particulate filter 29 at an appropriate timing with good repeatability.

Moreover, since a pressure loss of the particulate filter 29 changes depending on the amount of the particulate matter accumulated in the particulate filter 29, there is a well-known method of estimating the amount of accumulated particulate matter based on the pressure difference between before and after the particulate filter 29. Since this pressure difference method of estimating the amount of accumulated particulate matter is different from the estimating method of the present invention explained above, both estimating methods can be employed simultaneously. In other words, the amount of accumulated particulate matter can be estimated redundantly with two (both) methods in order to achieve an even more appropriate determination of when the regeneration of the particulate filter 29 is necessary. Since the embodiment of the present invention explained above uses a pressure difference sensor 32 to detect the pressure difference between before and after the particulate filter 29, an equivalent surface area and the particulate matter accumulation amount of the particulate filter 29 can be determined as well as the pressure difference across the particulate filter 29, the exhaust gas flow rate QEXH, and the temperature Tmp_bed_dpf (exhaust gas temperature) of the particulate filter 29.

The embodiment explained above is configured to determine the rate at which particulate matter is discharged from the engine 1 and the rate at which particulate matter is combusted by oxygen and NOx in terms of an amount per unit time and then consecutively integrate these amounts per unit time to obtain the particulate matter accumulation amount SPM over time. Of course, it will be apparent to those skilled in the art from this disclosure to, for example, determine the discharge rate and combustion rate in terms of an amount per cycle of the engine 1 and integrate these amounts per cycle in each cycle. Moreover, it is also acceptable to integrate the particulate matter discharge rate and the particulate matter combustion rate separately, and then finally find the difference between the resulting particulate matter discharge amount and the particulate matter combustion amount in order to calculate the particulate matter accumulation amount. In such a case, the particulate mater discharge amount and the particulate matter combustion amount are calculated within a prescribed interval (e.g., an interval between two mandatory regenerations) to determine the particulate matter accumulation amount within the prescribed interval.

As explained above, the control unit 5 basically constitutes a particulate matter discharge amount determining section, a particulate matter combustion amount determining section, a combustion amount adjusting section, a particulate matter accumulation amount estimating section and a regenerating section in the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-284232. The entire disclosure of Japanese Patent Application No. 2003-284232 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An exhaust gas cleaning system comprising:
a particulate filter installed in an exhaust passage of an engine to capture particulate matter contained in an exhaust gas discharged from the engine;
an NOx trapping catalytic converter disposed upstream of the particulate filter in the exhaust passage to absorb NOx contained in the exhaust gas;
a particulate matter discharge amount determining section configured and arranged to determine a discharge amount of the particulate matter from the engine based on an operating condition of the engine;
a particulate matter combustion amount determining section configured and arranged to determine a combustion amount of the particulate matter accumulated in the particulate filter that are combusted by the NOx in the exhaust gas;
a combustion amount adjusting section configured and arranged to adjust the combustion amount of the particulate matter estimated in the particulate matter combustion amount determining section based on an NOx adsorption condition of the NOx trapping catalytic converter; and
a particulate matter accumulation amount estimating section configured and arranged to estimate a particulate matter accumulation amount in the particulate filter by subtracting the combustion amount of the particulate matter adjusted in the combustion amount adjusting section from the discharge amount of the particulate matter.

2. The exhaust gas cleaning system as recited in claim 1, wherein
the particulate matter discharge amount determining section is further configured and arranged to determine the discharge amount within a prescribed interval,
the particulate matter combustion amount determining section is further configured and arranged to determine the combustion amount within the prescribed interval, and
the particulate matter accumulation amount estimating section further includes
an increase/decrease estimating section configured and arranged to estimate an increase/decrease amount of the particulate matter in the particulate filter within the prescribed interval by subtracting the combustion amount of the particulate matter adjusted in the combustion amount adjusting section from the discharge amount of the particulate matter; and
an integrating section configured and arranged to calculate an updated particulate matter accumulation amount by integrating the increase/decrease amount of the exhaust particulate matter within the prescribed interval.

3. The exhaust gas cleaning system as recited in claim 2, wherein
the prescribed interval is defined as a prescribed period of time.

4. The exhaust gas cleaning system as recited in claim 1, wherein
the combustion amount adjusting section further includes
an NOx amount estimating section configured and arranged to estimate an absorbed NOx amount adsorbed in the NOx trapping catalytic converter at a point in time,
an absorption ratio determining section configured and arranged to determine an absorption ratio of the absorbed NOx amount to a maximum amount of NOx that can be adsorbed to the NOx trapping catalytic converter at the point in time, and
an adjusting section configured and arranged to adjust the combustion amount of the particulate matter based on the absorption ratio.

5. The exhaust gas cleaning system as recited in claim 2, wherein
the combustion amount adjusting section further includes
an NOx amount estimating section configured and arranged to estimate an absorbed NOx amount adsorbed in the NOx trapping catalytic converter at a point in time,
an absorption ratio determining section configured and arranged to determine an absorption ratio of the absorbed NOx amount to a maximum amount of NOx that can be adsorbed to the NOx trapping catalytic converter at the point in time, and
an adjusting section configured and arranged to adjust the combustion amount of the particulate matter based on the absorption ratio.

6. The exhaust gas cleaning system as recited in claim 3, wherein
the combustion amount adjusting section further includes
an NOx amount estimating section configured and arranged to estimate an absorbed NOx amount adsorbed in the NOx trapping catalytic converter at a point in time,
an absorption ratio determining section configured and arranged to determine an absorption ratio of the absorbed NOx amount to a maximum amount of NOx that can be adsorbed to the NOx trapping catalytic converter at the point in time, and
an adjusting section configured and arranged to adjust the combustion amount of the particulate matter based on the absorption ratio.

7. The exhaust gas cleaning system as recited in claim 1, further comprising
a regenerating section configured and arranged to perform a mandatory regeneration of the particulate filter when the accumulation amount estimated in the particulate matter accumulation amount estimating section becomes equal to or larger than a prescribed value.

8. The exhaust gas cleaning system as recited in claim 2, further comprising
a regenerating section configured and arranged to perform a mandatory regeneration of the particulate filter when the accumulation amount estimated in the particulate matter accumulation amount estimating section becomes equal to or larger than a prescribed value.

9. The exhaust gas cleaning system as recited in claim 4, further comprising
a regenerating section configured and arranged to perform a mandatory regeneration of the particulate filter when the accumulation amount estimated in the particulate matter accumulation amount estimating section becomes equal to or larger than a prescribed value.

10. The engine exhaust gas cleaning system as recited in claim 1, wherein
the particulate matter combustion amount determining section further includes
a filter regeneration combustion amount estimating section configured and arranged to determine a filter regeneration combustion amount of the particulate matter combusted during a mandatory regeneration of the particulate filter.

11. The engine exhaust gas cleaning system as recited in claim 7, wherein
the particulate matter combustion amount determining section further includes
a filter regeneration combustion amount estimating section configured and arranged to determine a filter regeneration combustion amount of the particulate matter combusted during the mandatory regeneration of the particulate filter.

12. The engine exhaust gas cleaning system as recited in claim 8, wherein
the particulate matter combustion amount determining section further includes
a filter regeneration combustion amount estimating section configured and arranged to determine a filter regeneration combustion amount of the particulate matter combusted during the mandatory regeneration of the particulate filter.

13. The engine exhaust gas cleaning system as recited in claim 9, wherein
the particulate matter combustion amount determining section further includes
a filter regeneration combustion amount estimating section configured and arranged to determine a filter regeneration combustion amount of the particulate matter combusted during the mandatory regeneration of the particulate filter.

14. A method of determining a particulate matter accumulation amount comprising:
providing a particulate filter in an exhaust passage of an engine configured and arranged to accumulate particulate matter in an exhaust gas discharged from the engine;
disposing an NOx trapping catalytic converter in upstream of the particulate filter in the exhaust passage configured and arranged to adsorb NOx in the exhaust gas;
determining a discharge amount of the particulate matter discharged from the engine within a prescribed interval based on an engine output and an air fuel ratio of the exhaust gas;
determining a reference combustion amount of the particulate matter combusted within the prescribed interval by the NOx in the exhaust gas based on an exhaust gas flow rate and a temperature of the particulate filter;
adjusting the reference combustion amount of the particulate matter combusted within the prescribed interval in accordance with an absorption ratio of an amount of the NOx adsorbed in the NOx trapping catalytic converter to a maximum amount of NOx that can be absorbed in the NOx trapping catalytic converter;
determining an increase/decrease amount in a particulate matter accumulation amount within the prescribed interval by subtracting the adjusted reference combustion amount of the particulate matter from the discharge amount of the particulate matter discharged from the engine within the prescribed interval; and
calculating a total accumulated amount of the particulate matter by integrating the increase/decrease amount in the particulate matter accumulation amount within the prescribed interval to a previous particulate matter accumulation amount.

15. The method as recited in claim 14, wherein
the adjusting of the reference combustion amount of the particulate is based on a air fuel ratio of the exhaust gas.

16. An exhaust gas cleaning system comprising:
particulate matter accumulating means for accumulating particulate matter contained in an exhaust gas discharged from an engine;
NOx trapping means for absorbing NOx contained in the exhaust gas in upstream of the particulate matter accumulating means;
particulate matter discharge amount determining means for determining a discharge amount of the particulate matter from the engine based on an operating condition of the engine;
particulate matter combustion amount determining means for determining a combustion amount of the particulate matter accumulated in the particulate matter accumulating means that are combusted by the NOx in the exhaust gas;
combustion amount adjusting means for adjusting the combustion amount of the particulate matter estimated in the particulate matter combustion amount determining means based on an NOx adsorption condition of the NOx trapping means; and
particulate matter accumulation amount estimating means for estimating a particulate matter accumulation amount in the particulate matter accumulating means by subtracting the combustion amount of the particulate matter adjusted in the combustion amount adjusting means from the discharge amount of the particulate matter.

* * * * *